No. 836,664. PATENTED NOV. 27, 1906.
H. B. BOZARD.
GRAIN DISTRIBUTER.
APPLICATION FILED SEPT. 21, 1906.
2 SHEETS—SHEET 1.
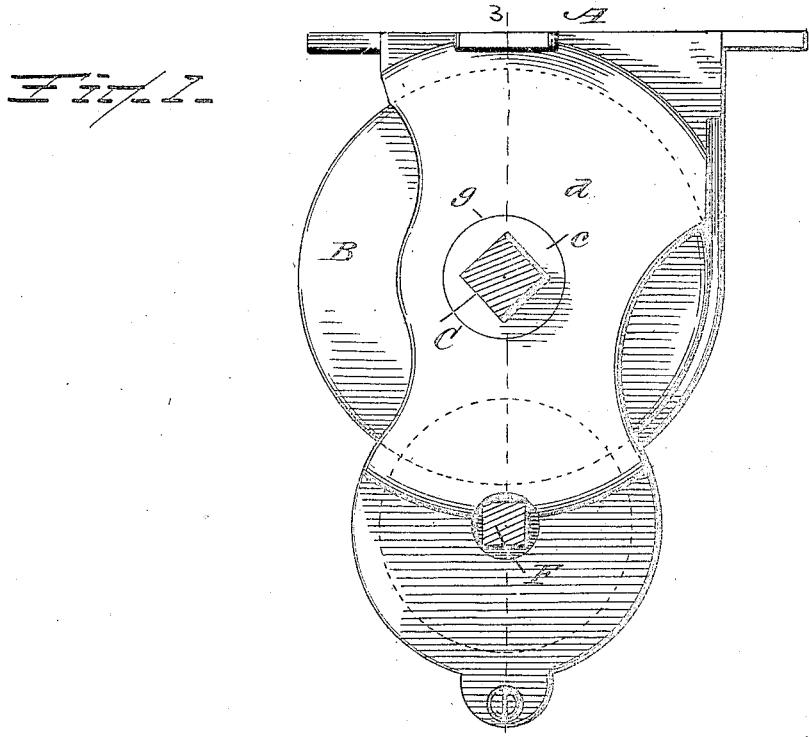
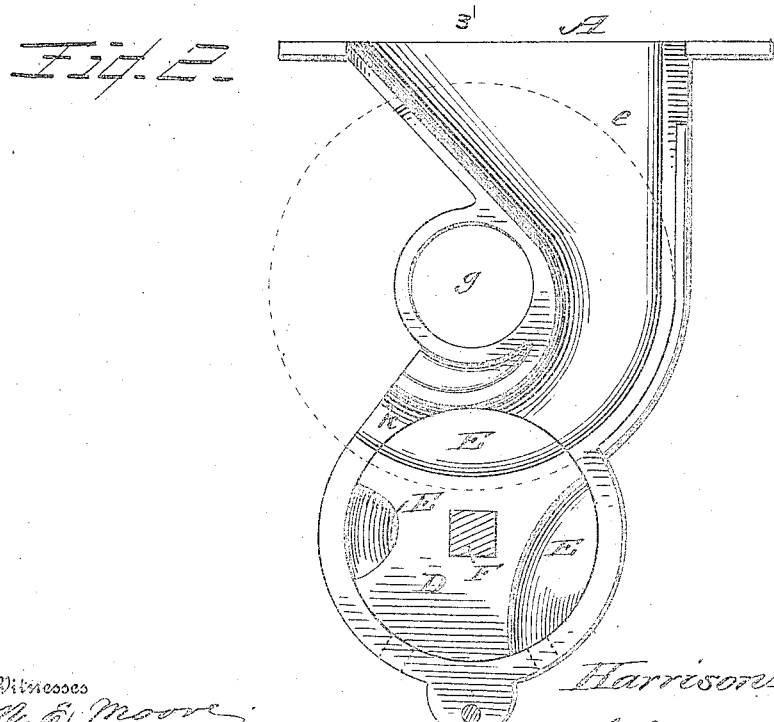
Witnesses
M. E. Moore
Wm. R. Coombs
Inventor
Harrison B. Bozard
by Chas. N. Fowler
Attorney
THE NORRIS PETERS CO., WASHINGTON, D.C.

No. 836,664. PATENTED NOV. 27, 1906.
H. B. BOZARD.
GRAIN DISTRIBUTER.
APPLICATION FILED SEPT. 21, 1906.
2 SHEETS—SHEET 2.
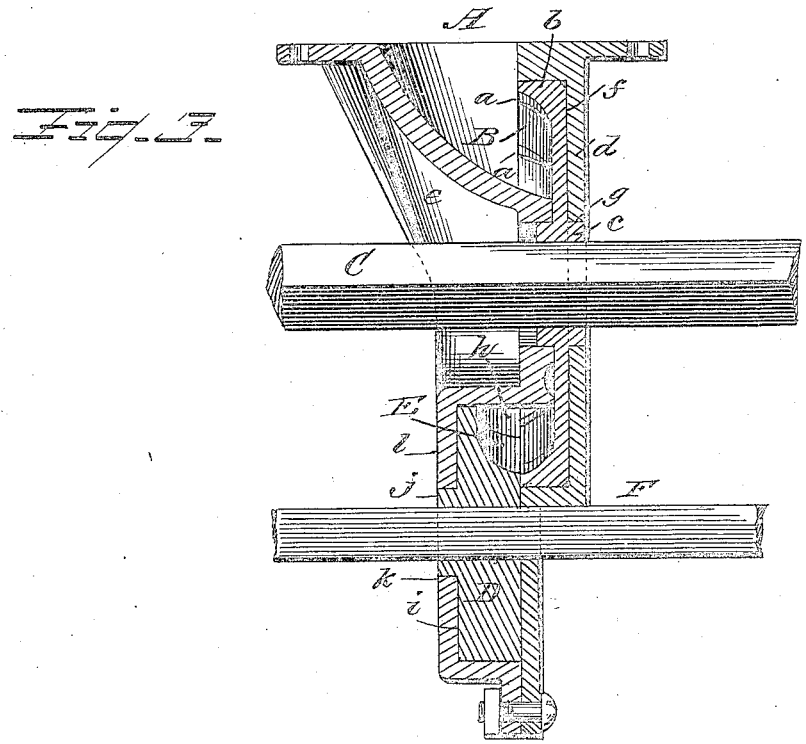
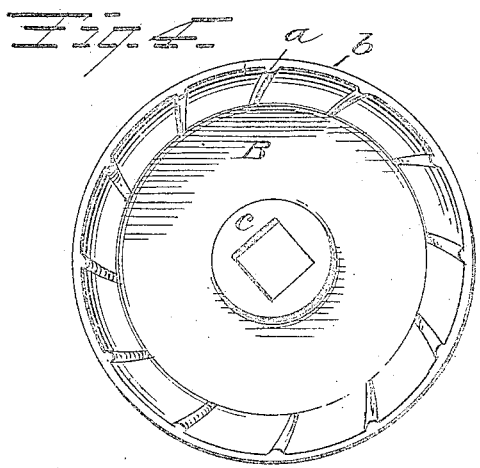
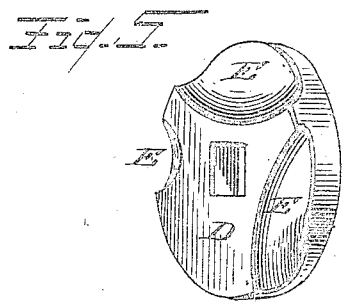
Witnesses
M. E. Moore
W. D. Coombs
Inventor
Harrison B. Bozard
By Chas. N. Fowler
Attorney
THE NORRIS PETERS CO., WASHINGTON, D. C.

UNITED STATES PATENT OFFICE.

HARRISON B. BOZARD, OF ALLEGANY, NEW YORK.

GRAIN-DISTRIBUTER.

No. 836,664. Specification of Letters Patent. Patented Nov. 27, 1906.

Application filed September 21, 1906. Serial No. 335,577.

*To all whom it may concern:*

Be it known that I, HARRISON B. BOZARD, a citizen of the United States, residing at Allegany, in the county of Cattaraugus and State of New York, have invented certain new and useful Improvements in Grain-Distributers; and I do hereby declare that the following is a full, clear, and exact description of the same, reference being had to the annexed drawings, making a part of this specification, and to the letters of reference marked thereon.

The present invention has reference to that class of force-feed seeding-machines or grain-distributers having a vertical feed-wheel rotatably mounted in a seed-cup; and the object thereof is to provide means whereby the quantity of seed sown is determined through the medium of an adjustable disk having pockets of varying capacities, so that the disk may be regulated to bring any one of the pockets on line with the throat of the seed cup or hopper, whereby the quantity of seed or grain to be sown may be regulated.

The invention consists in the means substantially as shown in the drawings and hereinafter described and claimed.

Figure 1 of the drawings is a side elevation of a seed cup or hopper with the feed-wheel located therein, the distributing-disk being shown in dotted lines; Fig. 2, a vertical section thereof with the feed-wheel removed; Fig. 3, a vertical section taken on line 3 3 of Fig. 1; Fig. 4 an inner face view of the feed-wheel; Fig. 5, a perspective view of the distributing-disk.

In the accompanying drawings, A represents the usual seed cup or hopper, which may be of any preferred construction and in which is located the feed-wheel B, provided with suitable ribs or teeth $a$ upon the inner side of the rim $b$.

Although I have shown this form of feed-wheel as being the most practical, any suitable wheel may be substituted of any preferred form and construction as found most desirable, and the seed cup or hopper A is constructed in two sections bolted or otherwise held together.

The feed-wheel B is rigidly mounted on a rotatable shaft C, said shaft extending through a hub $c$ of the feed-wheel, the shaft in the present instance being flat sided to correspond with the flat-sided opening in the hub of the wheel.

Any suitable form of hub and shaft may be substituted for that shown and the hub rigidly connected to the shaft in any suitable manner that will admit of the feed-wheel and shaft rotating together. The two detachable sections of the seed cup or hopper A are shown at $d$ $e$, the former having a mortised seat $f$ for the feed-wheel B, also an opening $g$ for the hub thereof. The section $e$ of the feed cup or hopper is constructed so as to present a throat $h$ for the seed or grain to pass from the feed-wheel to the distributing-disk D, said disk being located in a recessed seat $i$ and its hub $j$ in an opening $k$ in the wall $l$ of the feed cup or hopper section.

The disk D has a plurality of pockets E and is mounted upon a suitably-formed shaft F, any one of the number of pockets being brought on line with the throat $h$, so as to receive the seed from the feed-wheel B, thereby distributing the seed in regulated quantities.

The adjustable seed-distributer in the form of a disk has pockets of varying capacities, which regulates the size of the throat discharge-opening, whereby all kinds of grain may be sown, the disk forming a part of the orifice that determines the quantity of seed sown and the speed determining the quantity per acre.

The disk D when adjusted will contract or enlarge the throat-opening in the feed cup or hopper A, so as to sow a maximum or minimum quantity of seed of whatever size When the smaller pocket of the seed-distributing disk is brought in line with the throat of the seed cup or hopper, it will form a thicker wall that reduces the size of the throat toward the feed-wheel and is regulated by a minimum and maximum speed for sowing peas, oats, barley, and other medium grain and seed.

Any number of pockets may be provided, so that when any one is brought on line with the throat-opening it will contract or enlarge the throat-opening, according to the size of the pocket brought opposite the opening, the throat-orifice being open its full capacity—one-third, or one-half, or any fraction of its full capacity, as may be desired—as I do not desire to limit my invention to the number of pockets or means provided in the adjustable disk for regulating the throat discharge of the seed cup or hopper.

I have used the word "pocket" as the best term to describe the depressions indicated at E; but any vertically-adjustable disk or wheel having depressions in its face or like means whereby the discharge-throat of the hopper or seed-cup is contracted or enlarged as circumstances require would be an equivalent to the disk shown.

The adjustable distributing-disk forms a complete part of the grain-distributing wall and throat-orifice which determines all quantities sown from the smallest to the largest seed. In turning the shaft upon which the series of distributing-disks are mounted through any suitable means found best adapted to the purpose the series of disks on the shaft will be adjusted as desired.

Having now fully described my invention, what I claim as new, and desire to secure by Letters Patent, is—

1. In a grain-distributer, an adjustable distributing disk or wheel having a plurality of pockets or depressions to regulate the throat-orifice for the discharge of the grain, substantially as and for the purpose set forth.

2. In a grain-distributer, a horizontally-rotatable shaft, a distributing disk or wheel thereon having a plurality of pockets or depressions brought on line with the throat-orifice to regulate the size thereof, substantially as and for the purpose described.

3. In a grain-distributer, a rotatable feed-wheel, and a distributing-disk located on line with the throat-orifice of the seed hopper or cup, said disk having a plurality of pockets or depressions and adjustable to regulate the discharge-opening in the throat-orifice, substantially as and for the purpose specified.

In testimony whereof I affix my signature in presence of two witnesses.

HARRISON B. BOZARD.

Witnesses:
   JNO. A. RYAN,
   HARRY M. KRAMPF.